(12) United States Patent
Farrugia et al.

(10) Patent No.: US 10,542,078 B1
(45) Date of Patent: Jan. 21, 2020

(54) SYSTEM AND METHOD OF LOAD BALANCING TRAFFIC BURSTS IN NON-REAL TIME NETWORKS

(71) Applicant: Parallels International GmbH, Schaffhausen (CH)

(72) Inventors: Daniel Farrugia, Sliema (MT); Nikolay Dobrovolskiy, Moscow (RU); Serguei M. Beloussov, Costa Del Sol (SG)

(73) Assignee: Parallels International GmbH, Schaffhausen (CH)

( * ) Notice: Subject to any disclaimer, the term of this patent is extended or adjusted under 35 U.S.C. 154(b) by 269 days.

(21) Appl. No.: 15/621,048

(22) Filed: Jun. 13, 2017

(51) Int. Cl.
*H04L 29/08* (2006.01)
*H04L 12/803* (2013.01)
*H04L 12/801* (2013.01)
*H04L 12/707* (2013.01)

(52) U.S. Cl.
CPC ........ *H04L 67/1008* (2013.01); *H04L 47/125* (2013.01); *H04L 67/101* (2013.01); *H04L 45/22* (2013.01); *H04L 47/10* (2013.01)

(58) Field of Classification Search
CPC ... H04L 67/1008; H04L 67/101; H04L 47/10; H04L 47/125; H04L 45/22
USPC ...................................................... 709/235
See application file for complete search history.

(56) References Cited

U.S. PATENT DOCUMENTS

| | | | | |
|---|---|---|---|---|
| 6,128,657 A * | 10/2000 | Okanoya | ................. | G06F 9/505 709/224 |
| 8,046,446 B1 * | 10/2011 | Karr | .................... | H04L 67/1097 709/223 |
| 8,850,002 B1 * | 9/2014 | Dickinson | ............... | H04L 47/70 370/395.32 |
| 2006/0218279 A1 * | 9/2006 | Yamaguchi | ......... | H04L 67/1008 709/226 |
| 2006/0224773 A1 * | 10/2006 | Degenaro | ............. | G06F 9/5083 709/240 |
| 2007/0280124 A1 * | 12/2007 | Bivens | ................ | H04L 12/4625 370/252 |
| 2011/0138053 A1 * | 6/2011 | Khan | ...................... | G06F 9/505 709/226 |
| 2012/0254443 A1 * | 10/2012 | Ueda | ................... | H04L 67/1008 709/226 |
| 2015/0381453 A1 * | 12/2015 | Skjolsvold | .......... | H04L 43/0876 709/224 |
| 2016/0065663 A1 * | 3/2016 | Yang | ................... | H04L 67/1008 709/219 |

(Continued)

OTHER PUBLICATIONS

The Power of Two Random Choices, Marc's Blog, https://brooker.co.ca/bog.2012/01/17/two-random.html.

(Continued)

*Primary Examiner* — Michael C Lai
(74) *Attorney, Agent, or Firm* — Arent Fox LLP; Michael Fainberg (57) ABSTRACT

Disclosed are systems and methods for balancing load of computing resources among a plurality of servers by a plurality of load balancers. Clients communicate with a front-end device which forwards requests to the load balancers in a cyclical fashion. The load balancers estimate the impact of the received requests and can forward client requests to an estimated least loaded backend server. The backend servers process client requests and periodically report load statistics to the load balancers.

23 Claims, 4 Drawing Sheets

(56) References Cited

U.S. PATENT DOCUMENTS

2017/0346886 A1* 11/2017 Hikichi .................... G06F 9/00

OTHER PUBLICATIONS

The Power of Two Random Choices in Randomized Load Balancing bu Michael Mitzenmacher, University of California Dissertaion dated Fall 1996.

* cited by examiner

SYSTEM AND METHOD OF LOAD
BALANCING TRAFFIC BURSTS IN
NON-REAL TIME NETWORKS

FIELD OF TECHNOLOGY

The present disclosure relates generally to the field of computing networking, more specifically, to systems and methods of balancing load among a plurality of servers.

BACKGROUND

Load balancing refers to a technique for dividing the amount of work that a server must undertake between two or more servers of the same kind, so that more work is accomplished, and consequently all the clients will be served better (either more rapidly, or in a higher availability ratio). For example, on the Internet, web sites having large amounts of traffic usually use load balancing in order to achieve better performance of their web servers.

Several approaches have been presented for balancing the load between servers. One approach is to randomly pick a server, which relies on chance and can result in the selection of an overloaded server rather than an idle server. In another approach, a load balancer picks an idlest server according to load information reported by the servers. However, in this approach, the load information may be stale due to the lack of real-time information, and result in poor results when an irregular stream of requests arrive. Accordingly, there is a need in the art for an improved technique for load balancing on computing resources among multiple computing devices.

SUMMARY

Thus, a system and method is disclosed herein for load balancing on computing resources among a plurality of services, and, more particularly, for load balancing traffic bursts in non-real time networks. Exemplary aspects of the present disclosure can mitigate the impact of sudden traffic bursts coming through one or more load balancers at the same time. The described technique is able to avoid overwhelming a same backend server by estimating the load impact of pending requests before the actual load is reported by the backend server farm. Exemplary aspects of the present disclosure rely on a statistical model to predict which is the most likely idle backend server rather than picking a server randomly or merely relying on historical server usage data.

According to one exemplary aspect of the present disclosure, a method is provided for balancing load of computing resources among a plurality of servers by a plurality of load balancers. The method includes receiving, by a first load balancer and from each of the plurality of servers, resource usage statistics associated with services executing in the servers, wherein the resource usage statistics indicate a current load of each server. The method further includes receiving, by the first load balancer, a plurality of requests for the services, wherein the requests are received from a front-end device according to a cyclical pattern with the first load balancer and one or more peer load balancers. The method includes determining, by the first load balancer, a total number of requests received by the plurality of load balancers based on the cyclical pattern, and determining, by the first load balancer, an estimated increased load of each of the plurality of servers based on the received resource usage statistics and the total number of requests. The method includes forwarding, by the first load balancer, the requests to the servers based on their respective estimated increased load.

According to another exemplary aspect, determining the total number of requests received by the plurality of load balancers based on the cyclical pattern further comprises determining, by the first load balancer, an estimated total number of requests for each service type executing in the servers based on a ratio of service types at the first load balancer and on the determined total number of requests received by the plurality of load balancers. Determining the estimated increased load of each of the plurality of servers further comprises determining, by the first load balancer, an estimated increased load of each of the plurality of servers based on the received resource usage statistics and on the estimated total number of requests for each service.

In another exemplary aspect, determining the estimated increased load of each of the plurality of servers, including a first server, further includes calculating an estimated increased load of each service type executing in the first server by multiplying the estimated total number of requests for each service type and an average share of resources consumed by the corresponding service type; and calculating the estimated increased load of the server by adding the estimated increased load of each service type.

In another exemplary aspect, the received resource usage statistics comprises resource usage statistics for a first service and resource usage statistics for a second service.

In another exemplary aspect, the estimated increased load of each of the plurality of servers is determined prior to receiving second resource usage statistics at a next update interval.

In another exemplary aspect, determining the total number of requests by adding the number of requests actually received by the first load balancer to a number of requests estimated received by the peer load balancers based on a share ratio of the cyclical pattern.

In another exemplary aspect, forwarding the requests to the servers based on their respective estimated increased load further includes selecting one of the servers having a least of the respective estimated increased load to fulfill a first request of the plurality of requests; and forwarding the first request to the selected server.

In another exemplary aspect, determining the total number of requests received by the plurality of load balancers is performed without coordinating with peer load balancers of the plurality of load balancers.

In another exemplary aspect, wherein the cyclical pattern comprises a round robin algorithm that forwards requests to the plurality of load balancers based on a respective share ratio.

According to one exemplary aspect of the present disclosure, a system is provided for balancing load of computing resources among a plurality of servers. The system includes a plurality of load balancers including a first load balancer; and a front-end device configured to receive a plurality of requests from one or more clients, and forward the plurality of requests to the plurality of load balancers according to a cyclical pattern. Each of the plurality of load balancers includes a processor configured to receive, from each of the plurality of servers, resource usage statistics associated with services executing in the servers, wherein the resource usage statistics indicate a current load of each server; determine a total number of requests received by the plurality of load balancers based on the cyclical pattern; determine an estimated increased load of each of the plurality of servers based on the received resource usage statistics and the total number of requests; and forward the requests to the servers based on their respective estimated increased load.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for balancing load of computing resources among a plurality of servers by a plurality of load balancers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
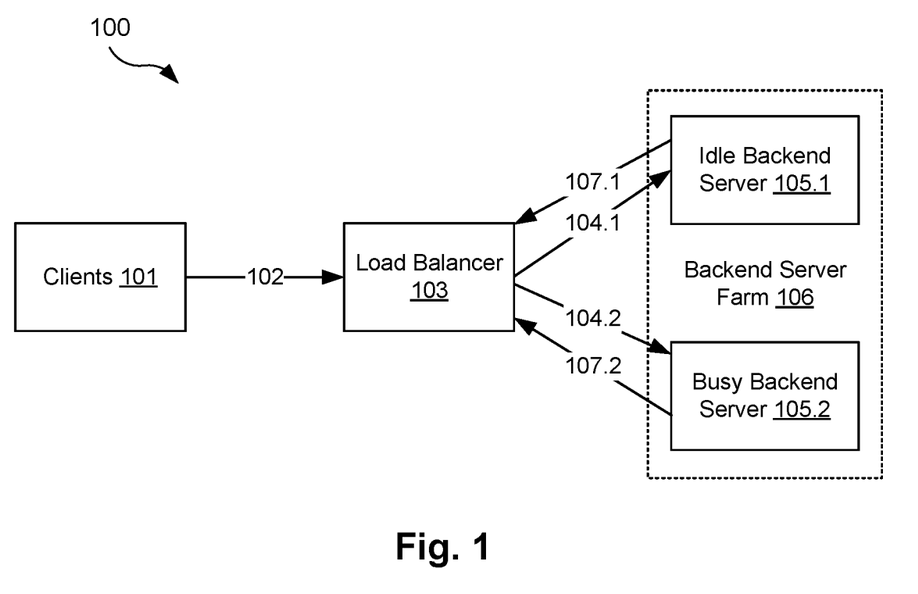
FIG. 1 illustrates a block diagram illustrating a load balancing topology.

FIG. 1 is a block diagram illustrating a load balancing topology 100 having one or more clients 101, a load balancer 103, and a backend server farm 106 having multiple backend servers 105.1, 105.2 (collective referred to as backend servers 105). The load balancer 103 may be configured to forward (104) client requests (102) either by picking a backend server 105 at random, or by receiving load statistics (107) from the backend server farm 106 in order to forward client requests 102 to the least loaded server 105.1. The former method relies on chance and could pick an overloaded server 105.2 rather than idle one 105.1, whilst the latter method will pick the idlest server 105.1 per the load information 107.

However, the load balancer 103 does not receive the information 107 in real time, but in update intervals, due to the time required to sample (calculate) the load on the servers 105 and the delay incurred to transmit the information 107. Therefore, the information 107 might be stale by the time that the load balancer 103 receives the information 107, particularly in situations where there is a burst of requests 102 during an update interval.

In general, the load balancer 103 forwards requests 104 per the latest information 107 and irrespective of the additional load the requests 104 would generate in the server farm 106. If there is a spike in requests 102, the load balancer 103 would forward requests 104 to the same server 105, and the server 105 will not be able to report 107 to the load balancer that it is overloaded until the next update.

Figure 2:
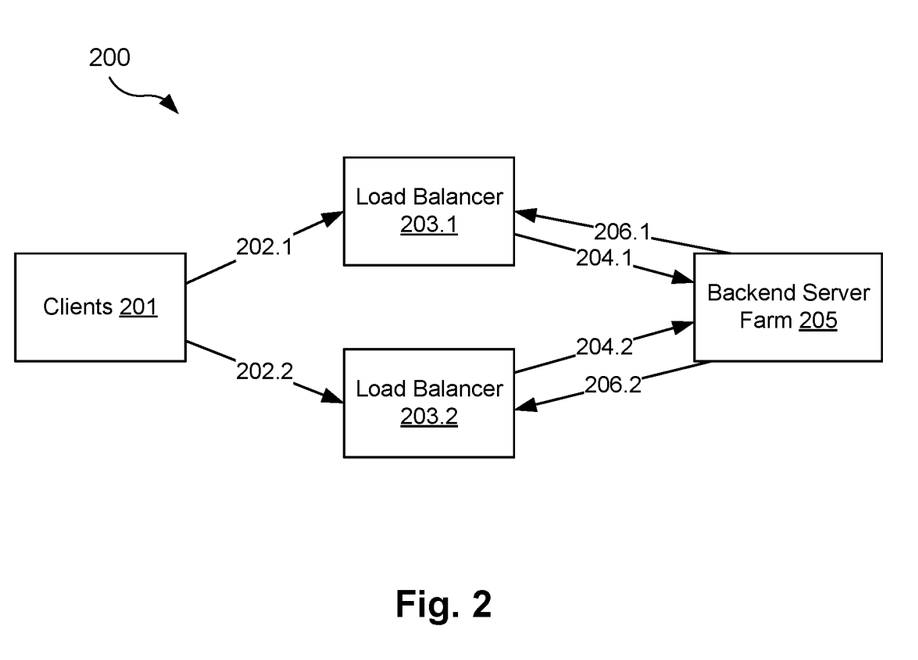
FIG. 2 illustrates a block diagram illustrating a multiple load balancing topology.

FIG. 2 is a block diagram illustrating a multiple load balancing topology 200 having one or more clients 201, multiple load balancers 203.1, 203.2 (collectively referred to as load balancers 203), and a backend server farm 205. In the depicted scenario with multiple load balancers 203, the delay to distribute the load information (206) is further exacerbated since the information 206 must be transmitted to all of the load balancers 203. Furthermore, the load balancers 203 are only concerned with those requests 202 passing through them and are unaware of requests forwarded (204) by their peers 203. Thus, during a traffic spike, the load balancers 203 may forward requests 204 to a same individual server within the server farm 205 in a "thundering herd" manner, rather than coordinating to distribute the requests 202 evenly across the least loaded servers in the server farm 205.

It is generally understood that a perfect load distribution is not possible because communication does not occur in real time and the impact of a request cannot be precisely determined before the request is serviced. That said, there are a number of known approaches for mitigating a "thundering herd" type of problem, including a prominent approach referred to as the Power-of-Two Choices algorithm. In this approach, the algorithm picks two random servers (e.g., Server 1 and Server 2), and then selects the least loaded server (say, Server 2) from the two. The algorithm will avoid forwarding all requests to the same selected Server 2 since it is unlikely that all load balancers will pick the same Server 2 as part of its random two. However, it has been determined that the picked Server 2 is unlikely to be an optimal choice due to the following factors. First, the load of the servers is not taken into consideration when picking the two servers randomly. Second, the nature of the request itself is not examined. Finally, the impact on the selected Server 2 is not assessed beforehand. In contrast, exemplary aspects of the present disclosure takes these variables into account and is able to provide improved load balancing over the Power-of-Two Choices algorithm and other algorithms.

Figure 3:
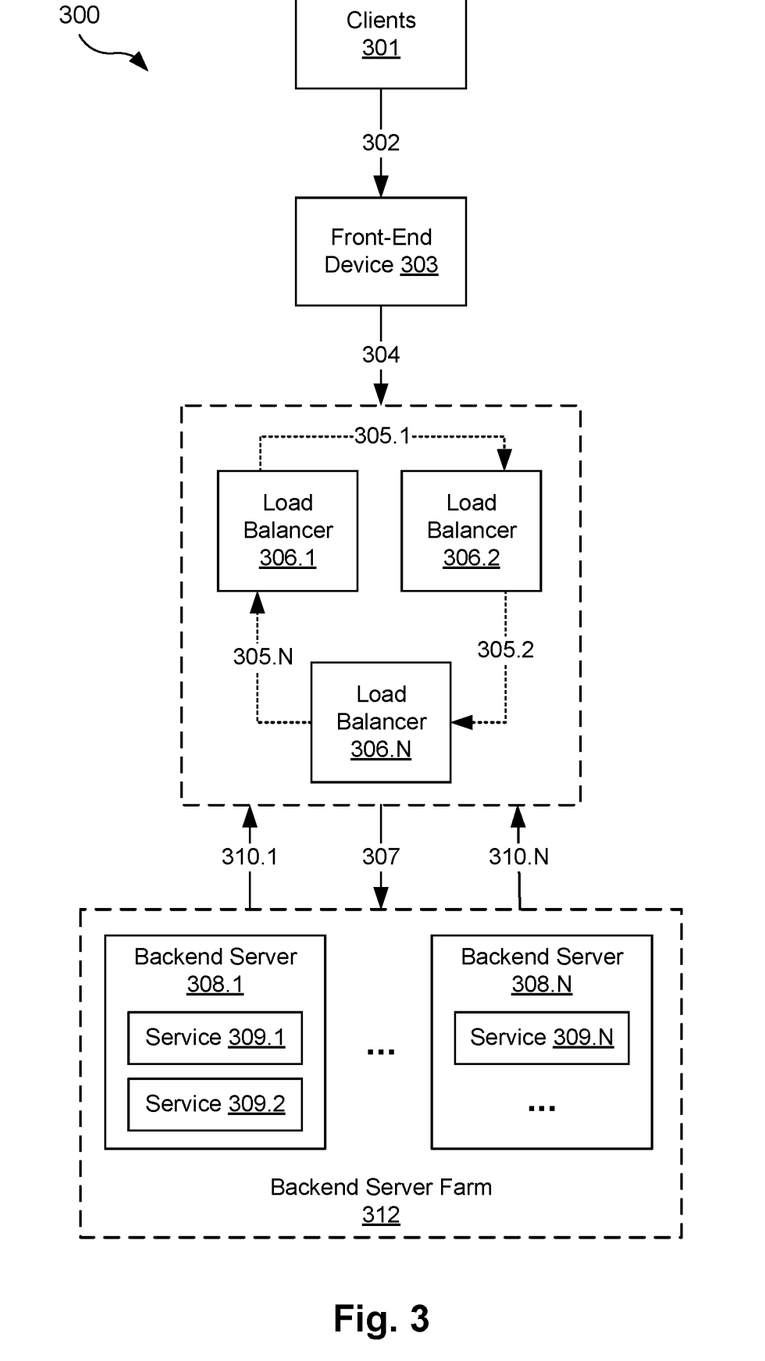
FIG. 3 illustrates a block diagram of a system for balancing load of computing resources among a plurality of servers by a plurality of load balancers according to an exemplary aspect.

FIG. 3 illustrates a block diagram of a system 300 for balancing load of computing resources among a plurality of servers by a plurality of load balancers according to an exemplary aspect. The system 300 includes on one or more clients 301, a front-end device 303, a plurality of load balancers 306.1, 306.2, . . . 306.N (collectively referred to as load balancers 306), and a plurality of backend servers 308.1 to 308.N (collectively referred to as backend servers 308) organized as a backend server farm 312.

According to an exemplary aspect, the clients 301 communicates (depicted as 302) with the front-end device 303, which then forwards requests 304 to the load balancers 306 in a cyclical (e.g., round robin) fashion. The load balancers 306 forward client requests 307 to an estimated least loaded backend server 308. The backend servers 308 process client requests 307 and periodically report load statistics 310 to the load balancers 306.

In one exemplary aspect, the front-end device 303 is positioned communicatively between the clients 301 and the load balancers 306. The request forwarding 404 using a round robin pattern generally requires little computational overhead and can be efficiently processed in hardware. In certain aspects, the front-end device 303 may be a specialized hardware device, such as a router or a network switch, or in other aspects, a software component executing on a server configured to forward requests as described herein. In some exemplary aspects, the front-end device 303 may be provided redundancy by including a backup front-end device using a networking protocol such as Virtual Router Redundancy Protocol (VRRP).

The front-end device 303 is configured to receive one or more requests (302) from the clients 301 to be fulfilled by one of the servers in the backend server farm 312. Each of the requests 302 has a request type which can be serviced by a server of a corresponding server type. For example, a request 302 may be a Hypertext Transfer Protocol (HTTP) request that is processed by a web server. In another example, a request 302 may be a domain name server (DNS) query that is processed by a DNS server. It is understood that other exemplary request and server types subject to load balancing may be utilized according to aspects of the present disclosure.

The front-end device 303 may be configured to forward requests 304 using a cyclical scheduling pattern (depicted as 305), such as a round robin algorithm. The cyclical scheduling pattern may dictate that the front-end device 303 forward requests to each of the load balancer 306 in equal portions and in a fixed, circular order without priority being given to a particular load balancer. Each load balancer may be forwarded at least one request before any load balancer receives its second request. For example, the front-end device 303 forwards a first request to a first load balancer 306.1, then another request to the next load balancer 306.2 in the sequence, and so forth until the last load balancer 306.N is forwarded a request, and then the cycle repeats. In some exemplary aspects, the front-end device 303 may forward requests to each load balancer 306 in equal portions in a randomized order. The order in which the requests 304 are forwarded in each cycle (i.e., turn) 405 can be randomized to improve the odds that each load balancer 306 is receiving a fair representation of all requests 304 being processed by the front-end device 303.

The requests 207 are distributed to the load balancers 306 in the cyclical scheduling pattern 305 in order for the load balancers 306 to know how many requests are being forwarded by the front end device 303 without communicating this information between them, or without including some kind of counter in the request. The described technique may use a round robin algorithm for distributing requests between the load balancers which advantageously enables a front end device, such as a conventional router or network switch, to be used without modification.

In some exemplary aspects, the front-end device 303 is configured to forward (304) an equal share of requests 302 to the load balancers 306. Based on the share ratio assigned to each load balancer (also referred to as "weight"), a load balancer 306.1 can deduce that for each request 304 that the load balancer receives, the other peer load balancers 306.2 to 306.N will receive the same amount of requests. In contrast to prior round robin algorithms which typically discards this information, the load balancer 306 may utilize this secondary information as part of the load balancing algorithm. Further, the secondary information derived from the round robin algorithm enables the load balancers 306 to determine the total amount of request 304 being processed by the front-end device 303, without having to communicate with each other or expressly obtain this information from the front-end device 303 itself. Accordingly, exemplary aspects of the present disclosure are able to overcome the limitations of non-real time communication by avoiding the need to communicate this information at all.

In one example, in a scenario with three load balancers 306.1, 306.2, 306.3 with equal weights (i.e., a share ratio of 1:1:1), a load balancer 306.1 can determine that each time it receives a request 304, the other two load balancers 306.2, 306.3 will receive a request each 304 before its next turn to process another request 304. Thus, the load balancer 306.1 can calculate that if it received three requests 304, then a total of nine requests 304 have been forwarded in total by the front-end device 303.

In some exemplary aspects, the share ratio assigned to each load balancer 306, or weight can be changed to a weighted ratio if all the load balancers 306 are aware of this configuration. For example, the load balancers 306 may be configured to assign a larger share ratio of one particular load balancer over the other load balancers (i.e., a share ratio of 2:1:1) that results in receiving six requests 304 each cycle while the other load balancers receive three requests each.

It is understood that a conventional round robin algorithm used for load balancing generally does not consider the load generated by forwarded requests. This issue is similar to the issues faced by random picking in the Power-of-Two Choices algorithm described above. However, according to certain aspects of the present disclosure, the system 300 is configured so as to render this issue irrelevant for purposes of the system 300 since the requests 304 are being forwarded to the load balancers 306 rather than to the backend servers 308.

In one exemplary aspect, one or more services 309.1, 309.2, to 309.N (collective referred to as services 309) are hosted on backend servers 308 and are responsible for fulfilling client requests 307. Services 309 may be applications for web serving, file sharing, and other types of servers configured to handle one or more request types. Servers 308 have a finite amount of resources, such as CPU or memory, available for running services 309. It is understood that multiple instances of a service 309 may be running concurrently to handle requests 307 for the same service 309. It is further understood that instances of different services 309 may be executing concurrently on the same server 308.

Servers 308 are configured to periodically report resource usage statistics 310 that indicate their current usage of resources to the load balancers 306. In one exemplary aspect, the servers 308 maintain separate resource usage statistics for each service 309 executing thereon. For example, if a server 308 is executing a web server service 308.1 and a database service 308.2, the server 308 maintains records of the CPU and memory resources used by the web server service and separate records of the CPU and memory resources used by the database service. In another example, if a server 308 is serving videos or applications, the server 308 keeps separate records of the CPU and memory resources consumed by each video or application. Accordingly, in contrast to conventional load balancing implementations which typically only collect system-wide load information, the load balancer collects per-service resource usage statistics. Collection of resource usage statistics for each service advantageously allows the load balancer to factor the nature of requests when predicting a most likely idle backend server, as described later.

It is understood that on a busy server 308, the usage of resources is constantly changing, and therefore the reported information should be based on a sample representing usage over a period of time. Sampling avoids reporting volatile information which is obsolete by the time the information arrives and is processed by a load balancer. A statistical share of resources consumed by a service can be calculated in several ways, including by computing the mean, mode, or median of the usage data collected in the sample. In some exemplary aspects, the server 308 may use a median of the usage data to ignore outlier readings which could skew the load balancing results.

In some exemplary aspects, the servers 308 may transmit the resource usage statistics 310 over a shared channel which is also used for servicing client requests. In other exemplary aspects, the servers 308 may transmit the resource usage statistics 310 over a dedicated channel (e.g., virtual local area network or VLAN) to avoid interference from other traffic. Each server 308 may transmit the resource usage statistics 310 to each load balancer 306 in a unicast fashion, or in a multicast fashion which transmits to all load balancers at the same time.

The load balancers 306 are configured to apply a statistical model using the resource usage statistics 310 to predict which of the servers 308 is most likely to be idlest server. In one exemplary aspect, the load balancers 306 may keep track of the services requested on each backend server 308 until the load information is updated. Each load balancer 306 may, starting with the resource usage statistics 310 reported in a previous time interval, estimate the additional load to be caused by currently pending requests 304 and base its load balancing scheduling decisions on this updated estimated load. When the next batch of resource usage statistics arrives from the servers 308, the load balancers 306 may discard the previous estimates and repeat the process. In some exemplary aspects, a load balancer 306 may calculate an estimated load generated on the servers by multiplying an average share of resources consumed by the services and the number of requests received for those services. It is noted that such an estimate of generated load might consider only the requests from one particular load balancer.

Accordingly, to provide a full picture of the actual load generated on the backend server farm 312 by the requests coming from the front-end device 303, a load balancer 306 is configured to estimate the generated load on the servers 308 caused by all requests based on resource usage statistics 310 for each service and on an estimate of the total number of requests for each service. In some exemplary aspects, the load balancer may be configured to estimate the generated load by multiplying the total number of requests by the average share of resources consumed by the service instances. The load balancer 306 performs this calculation for each server 308 in the backend server farm 312, and then selects the least loaded server 308 to fulfill the request.

As described earlier, a particular load balancer 306.1 can determine the total number of requests coming from the front-end device (i.e., including requests received not just by load balancer 306.1 but also its peer load balancers) based on the share ratio assigned to each load balancer. It is noted that although the nature of the requests (e.g., request type) received by the peer load balancers may be unknown to the load balancer 306.1, the load balancer 306.1 can estimate the type of requests by assuming that the ratio of requested services is the same as or similar to the requests received by the load balancer 306.1 itself. It has been determined that this assumption can be made with high confidence since it is based on a representative sample, especially in certain aspects in which the order of the requests (e.g., round robin) is randomized by the front-end device 303. Accordingly, certain aspects of the present disclosure enable a load balancer to make load distribution decisions based on an estimated impact caused by requests forwarded by peer load balancers without directly communicating with the peer load balancers.

Figure 4:
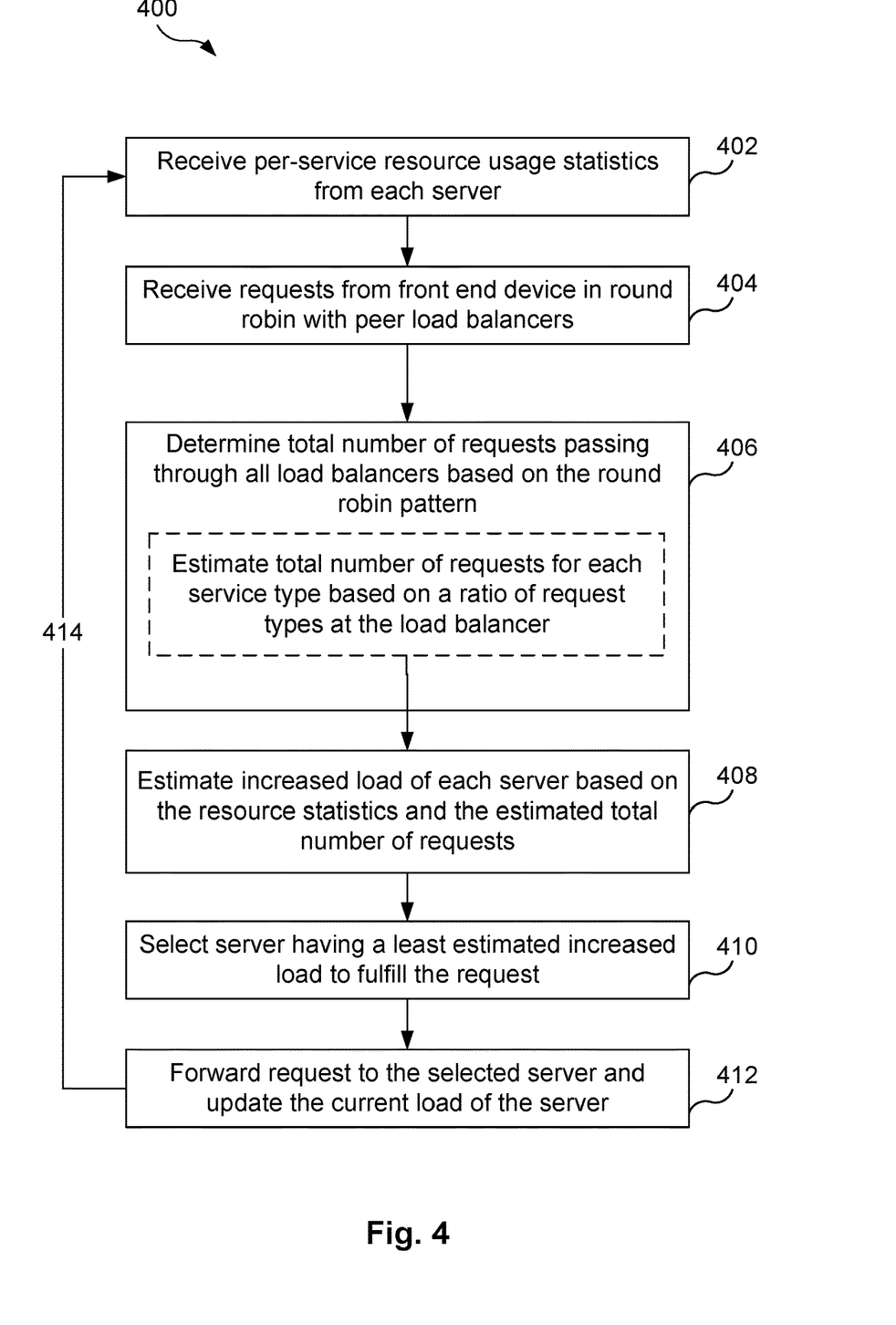
FIG. 4 illustrates a flowchart of a method for balancing load of computing resources among a plurality of servers by a plurality of load balancers according to an exemplary aspect.

FIG. 4 illustrates a flowchart of a method 400 for balancing load of computing resources among a plurality of servers by a plurality of load balancers according to an exemplary aspect. The method 400 may be performed individually by a load balancer (e.g., load balancer 306.1) and by each of its peer load balancers (e.g., load balancers 306.2 to 306.N).

At step 402, a load balancer 306.1 receives from each of the servers 308 resource usage statistics associated with services executing in the servers. The resource usage statistics indicate a current load of each server. The load balancer 306.1 periodically receives new resource usage statistics. It is understood that the time interval defined between each update (i.e., update interval) is spent by the servers 308 sampling, preparing, and communicating new resource usage statistics.

In some exemplary aspects, the received resource usage statistics may be per-service resource usage statistics, i.e., resource usage statistics for a first service type, resource usage statistics for a second, different service type, etc. In some exemplary aspects, the received resource usage statistics may specify the share of resources consumed by a corresponding service type. An example of resource usage statistics for a particular service executing on a particular server is provided below in Table 1.

TABLE 1

Example resource usage statistics associated with Service A

| Resource | 3 sec | 6 sec | 9 sec | Median |
| --- | --- | --- | --- | --- |
| Memory | 1% | 5% | 3% | 3% |
| CPU | 5% | 25% | 2% | 5% |

The example resource usage statistics shown in Table 1 includes load data for a particular service (e.g., service 309.1) collected every 3 seconds since the last update interval. As shown, resource usage statistics indicate that the service 309.1 uses a median 3% share of memory and a median 5% share of CPU resources of the backend server (e.g., server 308.1) on which the service 309.1 is executing. It is further note that the outlier CPU reading of 25% collected at the $6^{th}$ second can be factored out by taking the median of all readings. The load data may include an amount of CPU resources and memory resources consumed by the particular service, although other types of resources may be tracked. While the example resource usage statistics of Table 1 are measured as a share of resources (e.g., percentages), exemplary aspects of the present disclosure may use other units and measurements, including absolute values (e.g., MBs of RAM).

At step 404, the load balancer 306.1 receives a plurality of requests for the services from the front-end device 305 according to a cyclical pattern with the first load balancer and one or more peer load balancers. In some exemplary aspects, the requests are received during a first time interval defined between the receipts of resource usage statistics from the servers 308. In some exemplary aspects, the cyclical pattern may be a round robin algorithm that forwards requests to the plurality of load balancers based on a respective share ratio. The round robin pattern may have a fixed or randomized order, and distributes requests based on equal share ratios or on pre-determined weighted share ratios.

At step 406, the load balancer 306.1 determines a total number of requests received by the plurality of load balancers based on the cyclical pattern. In some exemplary aspects, the load balancer 306.1 may estimate the number of requests received by its peer load balancers (306.2 to 306.N) based on a share ratio of the round robin pattern and on the number of requests the load balancer 306.1 itself has received. Then, the load balancer may determine a total number of requests by adding the number of requests actually received by the load balancer 306.1 to the number of requests estimated received by the peer load balancers. In this way, the load balancer 306.1 is able to determine the total number of requests coming to all load balancers without having to communicate with the peer load balancers or expressly receive that request count from the peer load balancers.

In some exemplary aspects, the load balancer 306.1 estimates the total number of requests broken down on a per-service level. The load balancer 306.1 may determine an estimated total number of requests for each service type executing in the servers based on a ratio of service types received at the load balancer 306.1 and a share ratio of the round robin pattern. To estimate the number of requests for a given service type received by the peer load balancers, the load balancer 306.1 can multiply the number of requests associated with a given service type received at the load balancer 306.1 by the cumulative weight (e.g., share ratio) of the peer load balancers. An example estimation is shown in Table 2 below.

TABLE 2

Example estimate of number of requests

| | Requests Received by Load Balancer | Requests Received by Peers (Estimate) | Total Requests (Estimate) |
|---|---|---|---|
| Service A | 10 | 20 | 30 |
| Service B | 5 | 10 | 15 |

Table 2 illustrates the estimate of the total number of requests received by a group of three load balancers 306.1, 306.2, 306.3 having an equal weight in the round robin from the front-end device 303. The second column specifies the actual number of requests received by the load balancer, per-service. For example, 10 requests for Service A and 5 requests for Service B have been received by the load balancer 306.1. The third column specifies the estimated requests received by the other load balancers 306.2, 306.3. In this case, based on the equal share ratio (i.e., 1:1:1), the peer load balancers 306.2, 306.3 have a cumulative weight of 2 (i.e., 1+1=2), and the load balancer 306.1 calculates the third column by multiplying the second column by two. Based on the assumption that the 1:3 ratio of requests for Service A to requests for Service B seen at the load balancer 306.1 will hold true at the peer load balancers 306.2, 306.3, the load balancer 306.1 estimates 20 total requests for Service A and 10 total requests for Service B have been received by the peer load balancers 306.2, 306.3. Finally, the forth column represents the total number of requests estimated to be received by all load balancers including the load balancer 306.1 and peer load balancers 306.2, 306.3 (i.e., the sum of the second and third columns). As such, the load balancer 306.1 determines that the load balancers have received a total of 30 requests for Service A and 15 requests for Service B.

At step 408, the load balancer 306.1 determines an estimated increased load of each of the plurality of servers based on the received resource usage statistics and the total number of requests. For example, the load balancer 306.1 can estimate the additional load generated on the servers by multiplying the average share of resources consumed by the services and the number of requests received for those services. Table 3 below shows an example estimation of the additional load generated on a backend server (e.g., server 308.1) after a number of requests have been received.

TABLE 3

Example estimate of additional load on Server 1

| | Number of Requests | CPU per Instance | CPU Estimate | Memory per Instance | Memory Estimate |
|---|---|---|---|---|---|
| Service A | 10 | 1% | 10% | 1% | 10% |
| Service B | 5 | 3% | 15% | 2% | 10% |
| Total | 15 | NA | 25% | NA | 20% |

As shown in Table 3, the load balancer 306.1 has received a number of requests from the front-end device, including 10 requests for Service A and 5 requests for Service B. Resource usage per instance is derived from the resource usage statistics obtained in step 402 (e.g., as shown in Table 1). For example, Service A uses a 1% share of CPU and 1% memory per instance of Service A; Service B is more resource intensive and uses 3% of CPU and 2% of memory per instance of Service B. The estimated additional load is calculated by multiplying the number of requests by resource usage per instance. For example, the load balancer 306.1 estimates that the 10 requests for Service A will cause an additional load of 10%(10×1%) share of CPU and 10% (10×1%) share of memory on the server 308.1; and the 5 requests for Service B will cause an additional load of 15% CPU (5×3%) and 10% memory (5×2%). Overall usage on a server can be calculated by adding the estimated resource usage of each service. For example, the load balancer 306.1 estimates that all requests going through itself will result in an overall load on the server 308.1 of 25% (10%+15%) share of CPU resources and 20% (10%+10%) share of memory resources. It is understood that this calculation and estimation may be performed for each backend server 308 in the backend server farm 312. That is, records similar to the records shown in Table 3 are kept for each server and updated on each request. These records are used to estimate the additional load being generated on the servers and to choose the least loaded server prior to forwarding the request.

In some exemplary aspects, the load balancer 306.1 estimates the increased load on a given server 308 on a per-service basis and taking into consideration the estimated requests received by the peer load balancers 306. That is, the load balancer 306.1 may determine an estimated increased load of each of the plurality of servers based on the received resource usage statistics and on the estimated total number of requests for each service. In some exemplary aspects, the load balancer 306.1 may calculate the estimated increased load of each service type executing in the server by multiplying the estimated total number of requests for each service type and an average share of resources consumed by the corresponding service type (as provided by the resource usage statistics received in step 402). As described earlier, the estimated increased load of each of the plurality of servers is determined prior to receiving resource usage statistics for a second time interval subsequent to the first time interval, i.e., the next update interval. An example estimation of additional load generated on a backend server farm 312 is shown in Table 4 below.

TABLE 4

Example of additional load generated on backend server farm

| | Current | | | Estimated | | |
|---|---|---|---|---|---|---|
| | Curr. CPU Usage | Curr. Mem Usage | Curr. Load Level | Est. CPU Usage | Est. Mem. Usage | Est. Load Level |
| Server 1 | 10% | 5% | 7.5% | 35% | 25% | 30% |
| Server 2 | 5% | 5% | 5% | 30% | 30% | 30% |
| Server 3 | 75% | 25% | 50% | 75% | 25% | 50% |

In some exemplary aspects, the load balancer 306.1 may calculate load levels of each server by taking a mean (average) of the resources in use (e.g., CPU and memory). This is done both for the currently used resources (as reported in the latest update interval at step 402) and estimated additional used resources (as determined in step 408). In the example shown in Table 4, the load balancer 306.1 determines the current load level of Server 1 is 7.5% by taking an average of the current resource usage ((10% current CPU usage+5% current memory usage)÷2). The load balancer 306.1 calculates that the estimated CPU usage of Server 1 is 35% (10% current+25% estimated additional), and the estimated memory usage of Server 1 is 25% (20% current+5% estimated additional). The load balancer 306.1 then calculates the estimated load level of Server 1 after servicing the current round of requests will be 30% by taking the average of the estimated increased resource usage ((35% estimated CPU usage+25% estimated memory usage)÷2). As noted below, at the time these estimates are generated, the estimated load on Server 3 remains at 50% because no requests will be forwarded to Server 3 as servers 1 and 2 are estimated to have less load. As a result, Servers 1 and 2 will likely receive all requests until their load levels reaches that of Server 3.

At step 410, the load balancer 306.1 selects one of the servers 308 to fulfill a request 304 based on the respective estimated increased loads and current loads. In some exemplary aspects, for each request 304 queued at the load balancer 306.1, the load balancer 306.1 selects a server 308 having the least of the respective estimated increased load to fulfill the request 304. At step 412, the load balancer 306.1 forwards the requests 307 to the selected server 308 in the backend server farm 312. In some exemplary aspects, the load balancer 306.1 updates its internal statistics to reflect the current load of the selected server has increased due to fulfilling the forwarded request 307. The load balancer 306.1 may increment the number of requests (see Table 3) after forwarding a request, while the current load is equivalent to the actual load and is received during the resource usage updates. The load balancer 306.1 continues to forward requests 307 from the front-end device 303 according to its estimates on the increased impact of request fulfillment on the servers 308 until a next round of resource usage statistics is received (shown as 414), at which point the described method 400 may repeat.

In some exemplary aspects, for each request 307 forwarded, the load balancer 306.1 selects the least currently loaded server having a least estimated increase in load, until the least loaded server reaches the estimated load level of the next least loaded server, at which point, the load balancer 306.1 may cycle between the servers. For instance, consider the scenario depicted in Table 4, in which the three servers (Server 1, Server 2, and Server 3) currently have 7.5%, 5%, and 50% respectively of their resources in use. Initially, the load balancer 306.1 forwards a present requests 307 to Server 2, since Server 2 is the least loaded server (5% usage). The estimated load level of Server 2 will increase until Server 2 reaches the load level of Server 1, which is the next least loaded server (7.5% usage). The load balancer 306.1 distributes requests equally between Server 1 and Server 2, until the estimated load level eventually reaches the load level of Server 3, which is the busiest server in the group (50% usage).

Figure 5:
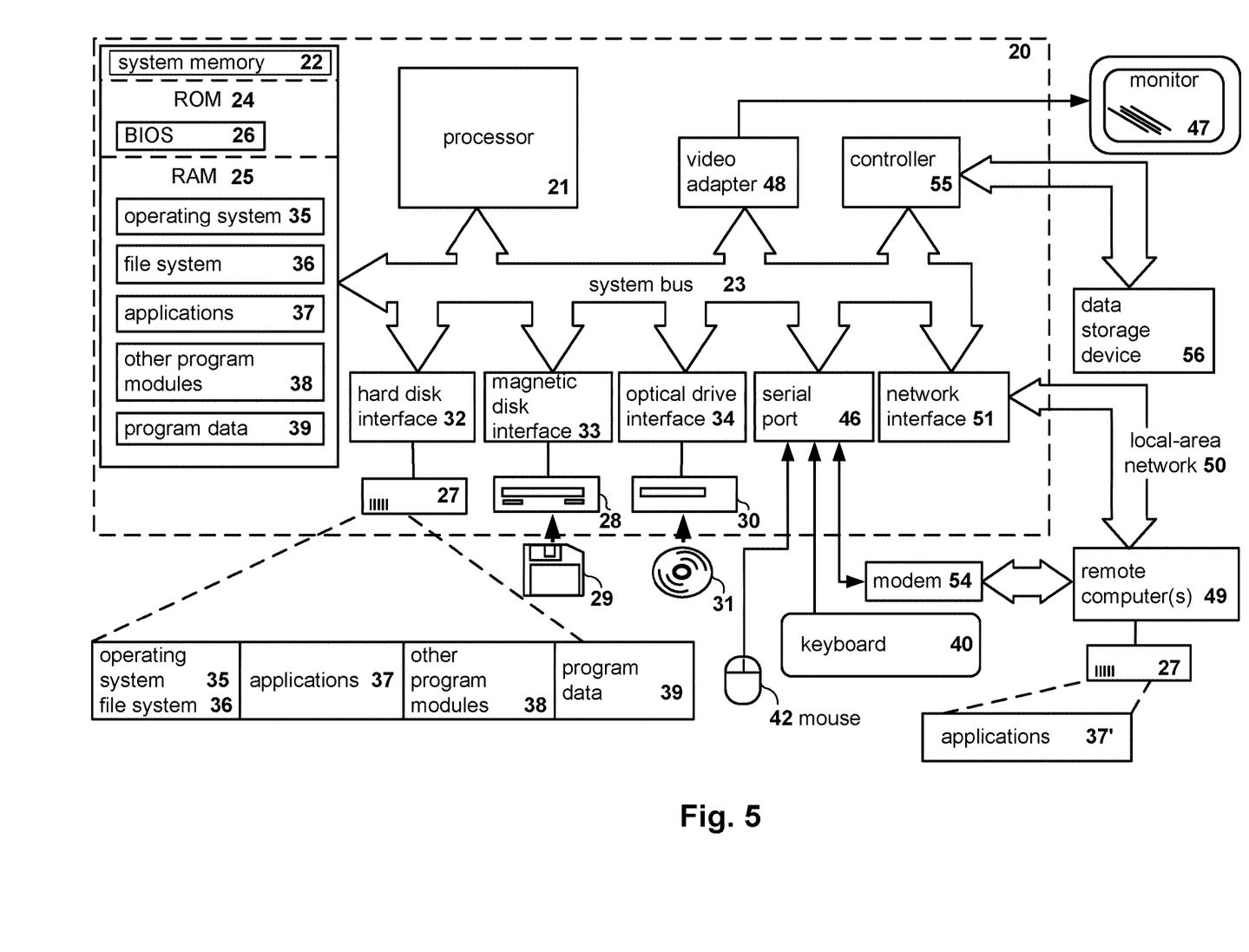
FIG. 5 illustrates a block diagram of a general-purpose computer system on which the disclosed system and method can be implemented according to an exemplary aspect.

FIG. 5 is a diagram illustrating a general-purpose computer system 20 on which aspects of systems and methods for scanning web pages may be implemented in accordance with an exemplary aspect. It should be noted that the computer system 20 can correspond to the front-end device 303, any of the load balancers 306, and physical servers 308 of the backend server farm 312, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for balancing loads of computing resources among a plurality of servers by a plurality of load balancers, wherein the method comprises:
   receiving, by a first load balancer of the plurality of load balancers, from each of the plurality of servers, resource usage statistics associated with services executing in the server, wherein the resource usage statistics received from the server indicate a current load of the server;
   receiving, by the first load balancer, a plurality of requests for the services executing in the servers, wherein the plurality of requests are received from a front-end device that selects a load balancer from among the plurality of load balancers to which each of the plurality of requests is to be directed according to a cyclical pattern;
   determining, by the first load balancer, a total number of requests received by the plurality of load balancers for the services executing in the servers, the total number being determined based on the cyclical pattern;
   determining, by the first load balancer, an estimated increased load of each of the plurality of servers based on the received resource usage statistics and the total number of requests; and
   for each of the plurality of requests, by the first load balancer, selecting a server of the plurality of servers to fulfill the request and forwarding the request to the selected server, the selection being based on respective estimates of increased loads of the plurality of servers.

2. The method of claim 1, wherein determining the total number of requests received by the plurality of load balancers for the services executing in the servers further comprises:
   determining, by the first load balancer, an estimated total number of requests for each service type executing in the plurality of servers based on a ratio of service types at the first load balancer and on the determined total number of requests received by the plurality of load balancers; and
   wherein determining the estimated increased load of each of the plurality of servers further comprises:
   determining, by the first load balancer, the estimated increased load of each of the plurality of servers based on the received resource usage statistics and on the determined estimated total number of requests for each service type.

3. The method of claim 1, wherein, for each of the plurality of servers, the determination of the estimated increased load of the server further comprises:
   for each service type, calculating an estimated increased load executing in the server by multiplying the estimated total number of requests for the service type and an average share of resources consumed by the service type; and
   calculating the estimated increased load of the server as a summation of the estimated increased loads calculated for each service type.

4. The method of claim 1, wherein the received resource usage statistics comprises resource usage statistics for a first service and resource usage statistics for a second service.

5. The method of claim 1, wherein the estimated increased load of each of the plurality of servers is determined prior to receiving second resource usage statistics at a next update interval.

6. The method of claim 1, wherein the determining the total number of requests received by the plurality of load balancers for the services executing in the servers comprises: adding a number of requests received by the first load balancer to a number of requests estimated as being received by all other load balancers of the plurality of load balancers based on a share ratio of the cyclical pattern.

7. The method of claim 1, wherein the selecting the server of the plurality of servers to fulfill the request comprises:
   selecting the server from among the plurality of servers having a least amount of the estimated increased load.

8. The method of claim 1, wherein determining the total number of requests received by the plurality of load balancers is performed without coordinating with other load balancers of the plurality of load balancers.

9. The method of claim 1, wherein the cyclical pattern comprises a round robin algorithm that forwards requests to the plurality of load balancers based on a respective share ratio.

10. A system for balancing loads of computing resources among a plurality of servers, wherein the system comprises:
   a plurality of load balancers including a first load balancer; and
   a front-end device configured to receive a plurality of requests from one or more clients, and forward the plurality of requests to the plurality of load balancers according to a cyclical pattern,
   wherein each of the plurality of load balancers includes a processor configured to:
      from each of the plurality of servers, receive resource usage statistics associated with services executing in the server, wherein the resource usage statistics received from the server indicate a current load of the server;
      determine a total number of requests received by the plurality of load balancers for the services executing in the servers, the total number being determined based on the cyclical pattern;
      determine an estimated increased load of each of the plurality of servers based on the received resource usage statistics and the total number of requests; and
      for each of the plurality of requests, select a server of the plurality of servers to fulfill the request and forward the request to the selected server, the selection being based on respective estimates of increased loads of the plurality of servers.

11. The system of claim 10, wherein the processor configured to determine the total number of requests received by the plurality of load balancers for the services executing in the servers comprises the processor configured to:
   determine an estimated total number of requests for each service type executing in the plurality of servers based on a ratio of service types at the first load balancer and on the determined total number of requests received by the plurality of load balancers; and
   wherein the processor configured to determine the estimated increased load of each of the plurality of servers comprises the processor further configured to:
   determine the estimated increased load of each of the plurality of servers based on the received resource usage statistics and on the determined estimated total number of requests for each service type.

12. The system of claim 10, wherein, for each of the plurality of servers, the processor configured to determine the estimated increased load comprises the processor configured to:
   for each service type, calculate an estimated increased load executing in the server by multiplying the estimated total number of requests for the service type and an average share of resources consumed by the service type; and
   calculate the estimated increased load of the server as a summation of the estimated increased loads calculated for each service type.

13. The system of claim 10, wherein the received resource usage statistics comprises resource usage statistics for a first service and resource usage statistics for a second service.

14. The system of claim 10, wherein the estimated increased load of each of the plurality of servers is determined prior to receiving second resource usage statistics at a next update interval.

15. The system of claim 10, wherein the processor is configured to determine the total number of requests received by the plurality of load balancers for the services executing in the servers by adding a number of requests received by the first load balancer to a number of requests estimated as being received by all other load balancers of the plurality of load balancers based on a share ratio of the cyclical pattern.

16. The system of claim 10, wherein the processor configured to select the server of the plurality of servers to fulfill the request comprises the processor configured to:
   select the server from among the plurality of servers having a least amount of the estimated increased load.

17. The system of claim 10, wherein the processor is configured to determine the total number of requests received by the plurality of load balancers without coordinating with other load balancers of the plurality of load balancers.

18. The system of claim 10, wherein the cyclical pattern comprises a round robin algorithm that forwards requests to the plurality of load balancers based on a respective share ratio.

19. A non-transitory computer readable medium comprising computer executable instructions for balancing loads of computing resources among a plurality of servers by a plurality of load balancers, including instructions for:
- receiving, by a first load balancer of the plurality of load balancers, from each of the plurality of servers, resource usage statistics associated with services executing in the server, wherein the resource usage statistics received from the server indicate a current load of the server;
- receiving, by the first load balancer, a plurality of requests for the services executing in the servers, wherein the plurality of requests are received from a front-end device that selects a load balancer from among the plurality of load balancers to which each of the plurality of requests is to be directed according to a cyclical pattern;
- determining, by the first load balancer, a total number of requests received by the plurality of load balancers for the services executing in the servers, the total number being determined based on the cyclical pattern;
- determining, by the first load balancer, an estimated increased load of each of the plurality of servers based on the received resource usage statistics and the total number of requests; and
- for each of the plurality of requests, by the first load balancer, selecting a server of the plurality of servers to fulfill the request and forwarding the request to the selected server, the selection being based on respective estimates of increased loads of the plurality of servers.

20. The non-transitory computer readable medium of claim 19, wherein the instructions for determining the total number of requests received by the plurality of load balancers for the services executing in the servers comprises instructions for:
- determining, by the first load balancer, an estimated total number of requests for each service type executing in the plurality of servers based on a ratio of service types at the first load balancer and on the determined total number of requests received by the plurality of load balancers; and
- wherein the instructions for determining the estimated increased load of each of the plurality of servers further comprises instructions for:
- determining, by the first load balancer, the estimated increased load of each of the plurality of servers based on the received resource usage statistics and on the determined estimated total number of requests for each service type.

21. The non-transitory computer readable medium of claim 19, wherein the instructions for determining, for each of the plurality of servers, the estimated increased load comprises instructions for:
- for each service type, calculating an estimated increased load executing in the server by multiplying the estimated total number of requests for the service type and an average share of resources consumed by the service type; and
- calculating the estimated increased load of the server as a summation of by adding the estimated increased loads calculated for each service type.

22. The non-transitory computer readable medium of claim 19, wherein the instructions for the selecting the server from among the plurality of servers to fulfill the request comprises instructions for:
- selecting the server from among the plurality of servers having a least amount of the estimated increased load.

23. The non-transitory computer readable medium of claim 19, wherein the cyclical pattern comprises a round robin algorithm that forwards requests to the plurality of load balancers based on a respective share ratio.

* * * * *